US 10,970,025 B1

(12) United States Patent
Richardson (10) Patent No.: US 10,970,025 B1
(45) Date of Patent: Apr. 6, 2021

(54) SMART ELECTRIC MIRRORS

(71) Applicant: William Brian Richardson, Upper Marlboro, MD (US)

(72) Inventor: William Brian Richardson, Upper Marlboro, MD (US)

( * ) Notice: Subject to any disclaimer, the term of this patent is extended or adjusted under 35 U.S.C. 154(b) by 0 days.

(21) Appl. No.: 16/550,283

(22) Filed: Aug. 26, 2019

(51) Int. Cl.
| | |
|---|---|
| *G06F 3/14* | (2006.01) |
| *A45D 42/16* | (2006.01) |
| *H04N 5/247* | (2006.01) |
| *H04N 5/225* | (2006.01) |

(52) U.S. Cl.
CPC ............ *G06F 3/1423* (2013.01); *A45D 42/16* (2013.01); *H04N 5/2253* (2013.01); *H04N 5/247* (2013.01)

(58) Field of Classification Search
CPC .... G06F 3/1423; H04N 5/2253; H04N 5/247; A45D 42/16
See application file for complete search history.

(56) References Cited

U.S. PATENT DOCUMENTS

| | | |
|---|---|---|
| D330,807 S | 11/1992 | Granzow |
| 5,223,984 A | 6/1993 | Schmid |
| 5,359,984 A | 10/1994 | Rice et al. |
| 5,742,442 A | 4/1998 | Allsup et al. |
| 5,777,808 A | 7/1998 | Rashad |
| 6,252,730 B1 | 6/2001 | Chabot |
| 6,296,363 B2 | 10/2001 | Chabot |
| 6,347,876 B1 | 2/2002 | Burton |
| 6,991,340 B2 | 1/2006 | Townsend, Jr. et al. |
| 7,300,169 B1 | 11/2007 | Yue |
| 7,912,646 B2 | 3/2011 | McCarthy et al. |
| 8,393,749 B1 | 3/2013 | Daicos |
| 2011/0194200 A1 | 8/2011 | Greenlee |
| 2012/0200704 A1 | 8/2012 | D'Addetta et al. |
| 2013/0050549 A1 | 2/2013 | Bilbrey |
| 2013/0163390 A1* | 6/2013 | Gossweiler, III .... G04G 17/083 368/14 |

(Continued)

FOREIGN PATENT DOCUMENTS

| | | |
|---|---|---|
| CN | 201287675 | 8/2009 |
| JP | 2010-16793 | 1/2010 |
| KR | 20100092075 | 8/2010 |

OTHER PUBLICATIONS

PC World ("Logitech's C922 webcam is the revered C920's vastly upgraded successor"). (Year: 2916).

*Primary Examiner* — Nasim N Nirjhar
(74) *Attorney, Agent, or Firm* — Stephen Christopher Swift; Swift & Swift, Attorneys at Law, P.L.L.C.

(57) ABSTRACT

A system, comprising two display screens, each having a reflective surface that can act as a mirror when the display screen is turned off, a camera attached to each display screen, cables connecting each camera to the display screen to which it is not attached, and a switch for each display screen, that can turn the display screen on or off. Alternatively, there may be two-sided mirrors that can be flipped down to cover the display screens, and flipped up to uncover them. The images on the display screens may be split between two or more cameras. Alternatively, there may be three or more display screens, and a switch for each display screen, that can turn the display screen on or off, and if on, select which camera's input will be displayed on the display screen, or else a switch for each connection between a camera and a display screen.

3 Claims, 8 Drawing Sheets

(56) References Cited

U.S. PATENT DOCUMENTS

| | | | |
|---|---|---|---|
| 2015/0097483 A1* | 4/2015 | Huelke | B60Q 3/80 |
| | | | 315/77 |
| 2017/0013188 A1* | 1/2017 | Kothari | H04N 5/23293 |
| 2017/0047960 A1* | 2/2017 | Kil | H04W 4/80 |
| 2020/0009444 A1* | 1/2020 | Putnam | A61B 5/7435 |

* cited by examiner

SMART ELECTRIC MIRRORS

BACKGROUND OF THE INVENTION

1. Field of the Invention

The present invention relates to display screens that can function as mirrors, or be combined with mirrors, and combined with cameras.

2. Description of the Prior Art

There are previous inventions of combinations of mirrors, display screens and/or cameras, but none that are equivalent to the present invention.

U.S. Pat. No. 5,223,984, issued on Jun. 29, 1993, to Ferdinand Schmid, discloses a hair grooming mirror apparatus, which enables a user to view the back of his head, using a pair of mirrors and a third mirror. It also includes a stand with legs to support the apparatus. The instant invention is distinguishable, because it uses display screens that can function as mirrors, or are combined with mirrors that can flip up and down, and also uses cameras.

U.S. Pat. No. 5,359,461, issued on Oct. 25, 1994, to Virginia Rice and Maybelle I. Gailas, discloses a portable cosmetic mirror apparatus, including a stand with legs and a light, with a magnification means. The instant invention is distinguishable, because it includes two or more display screens that can also function as mirrors, or are combined with mirrors that can flip up and down, and with cameras.

U.S. Pat. No. 5,742,442, issued on Apr. 21, 1998, to William Allsup and Joe Campbell, discloses a safety vehicle viewing system, wherein images from rear view mirrors are transmitted via a fiber optic cable to a viewing screen (which is similar to an interior rear view mirror). The instant invention is distinguishable, because it is portable, and it can be turned on and off.

U.S. Pat. No. 5,777,808, issued on Jul. 7, 1998, to Robin Winona Rashad, discloses a dual mirror beauty ensemble, with four mirrors attached to a chair, attached in back and in front, that can enable a user to view the back of his head. The instant invention is distinguishable, because includes display screens that can function as mirrors, or are combined with mirrors that can flip up and down, and with cameras.

U.S. Pat. No. 6,252,730, issued on Jun. 26, 2001, to J. Roland Chabot, and U.S. Pat. No. 6,296,363, issued on Oct. 2, 2001, to J. Roland Chabot, disclose a mirror mounting assembly for hair grooming and styling, using reflections from two mirrors. The instant invention is distinguishable, because it transmits an image from a camera to a display screen through a cable.

U.S. Pat. No. 6,347,876, issued on Feb. 19, 2002, to Johnnie Burton, discloses a lighted mirror assembly, with multiple mirrors that enable hands-free viewing of the back and sides of the head. The instant invention is distinguishable, because in it the image is transmitted from a camera to a display screen through a cable.

U.S. Pat. No. 6,991,340, issued on Jan. 31, 2006, to Ray Theodore Townsend, Jr. and Liansuo Xie, discloses an indirect viewing device, involving reflections between two pairs of mirrors. The instant invention is distinguishable, because in it the image is transmitted through a cable, rather than reflected.

U.S. Pat. No. 7,300,169, issued on Nov. 27, 2007, to Chi Yau Yue, discloses a viewing station with two mirrors, one of which is fixed while the other mirror is retractable. The instant invention is distinguishable, because in it the image is transmitted from a camera through a cable to a display screen, rather than reflected.

U.S. Pat. No. 7,912,646, issued on Mar. 22, 2011, to Kevin C. McCarthy, Eugenie V. Uhlmann and Niall R. Lynam, discloses a driver assistance system for a vehicle, in which the driver can view images from a camera in a rear view mirror. The instant invention is distinguishable, because it is separate from a vehicle.

U.S. Pat. No. 8,393,749, issued on Mar. 12, 2013, to Andrea Daicos, discloses a free-standing and adjustable tri-fold mirror. The instant invention is distinguishable, because it transmits images from a camera to a display screen through a cable.

U.S. Design Patent No. Des. 330,807, issued on Nov. 10, 1992, to Clarence E.

Granzow, discloses a design for a mirror having multiple parts that could be used for viewing the back of a user's head. The instant invention is distinguishable, because it transmits images from a camera to a display screen through a cable.

U.S. Patent Application Publication No. 2011/0194200, published on Aug. 11, 2011, to Laura Greenlee, discloses a rearview mirror that can be placed over a door. The instant invention is distinguishable, because it involves transmitting an image from a camera to a display screen through a cable.

U.S. Patent Application Publication No. 2012/0200704, published on Aug. 9, 2012, to Gian Antonio D'Addetta, Thomas Lich and Thomas Friedrich, discloses a device in a vehicle in which a central area and a border area can be switched between a transparent state and a mirrored state. The instant invention is distinguishable, because it is separate from a vehicle.

U.S. Patent Application Publication No. 2013/0050549, published on Feb. 28, 2913, to Brett Bilbrey, discloses a camera embedded in the housing of a display device, where the camera can be blocked by a sliding panel. The instant invention is distinguishable, because in it the camera can simply be turned off.

Chinese Patent No. 201287675, published on Aug. 12, 2009, to Wu Xuhua, discloses a back sight camera in an automobile door connected with a display screen in the automobile. The instant invention is distinguishable, because it is separate from a vehicle. (Unfortunately, only the English abstract is available for this patent in the Public Search Room of the U.S. Patent & Trademark Office.)

Japanese Patent No. 2010-16793, published on Jan. 21, 2010, to Shingo Yuasa et al., discloses an information display device, in which the user can view the back of his head, with mirrors that appear to be separate from the cameras and display screens. The instant invention is distinguishable, because in it display screens can function as mirrors, or are used in combination with mirrors that can flip up and down.

South Korean Patent Application No. KR 20100092075 A, published Aug. 20, 2010, to Keon Hee Cho, discloses a camera connected to a display screen. The instant invention is distinguishable, because it discloses multiple cameras connected to multiple display screens.

PC World ("Logitech's C922 webcam is the revered C920's vastly upgraded successor"). (Year: 2916) discloses a camera that can be used with a display screen. The instant invention is distinguishable, because it discloses multiple cameras connected to multiple display screens.

None of the above inventions and patents, taken either singly or in combination, is seen to describe the instant invention as claimed.

SUMMARY OF THE INVENTION

The present invention that you have described to me is understood to relate to a "smart electric mirror", which is a pair of display screens with reflective surfaces that can also function as mirrors, with attached cameras, alternatively, with two-sided mirrors that can flip down to cover the display screens, and flip up to uncover the display screens. A camera on a rear display screen can record the back of a user's head and display it on the front display screen. When they are turned off, both display screens appear as regular mirrors. When they are turned on, the user is not able to see his face in the front mirror/display screen, but instead is able to see the entire back of his head in real time. The image on the display screens may be split to show the input from more than one camera. Preferably, the cameras are able to zoom in and out. Optionally, the mirror has a handle that is adjustable and can be held comfortably in front or on the side and can be adjusted to a comfortable height. Preferably, the invention comes with tripod legs to stand on. Preferably, the invention comes with a handle that can be removed, because each mirror/screen can be adjusted by moving it by hand. The invention may have a long metal tube that connects each mirror/screen ("mirror") and has its electrical cables and operating components. The mirrors preferably are on hinges that allow them to move up and down and make slight turns to either side. When the mirrors are on, any movement of the head in the rear mirror will also display in the front mirror at the same time. The back and front mirror will act as one in the same. When the mirrors are turned on, the user will only be able to see the back of the head area in the front mirror, or anything else in the rear mirror will be displayed in the front mirror exactly as it is in the rear mirror. The mirrors also come with lights that can make the head areas appear more clearly in the dark. The invention preferably can be folded to a position that will make it easier to move around. The mirrors can also come in different sizes. The mirror can be tilted to see down the back areas. This mirror can be made for home personal use, for hair salons, and many other organizations. This mirror is made to display any areas in the rear and bring them to the front as if a person had eyes in the back of their head. Alternatively, the present invention may have three or more mirrors/display screens.

Accordingly, it is a principal object of the invention to provide an aid for personal grooming.

It is another object of the invention to provide display screens that can also be used as mirrors.

It is a further object of the invention to provide a combination of mirrors/display screens that is portable.

Still another object of the invention is to provide an apparatus that could be used for security.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a system of two or more interconnected display screens and cameras. Two-sided mirrors may flip down to cover the display screens. Alternatively, the display screens, when turned off, can also function as mirrors.

Figure 1:
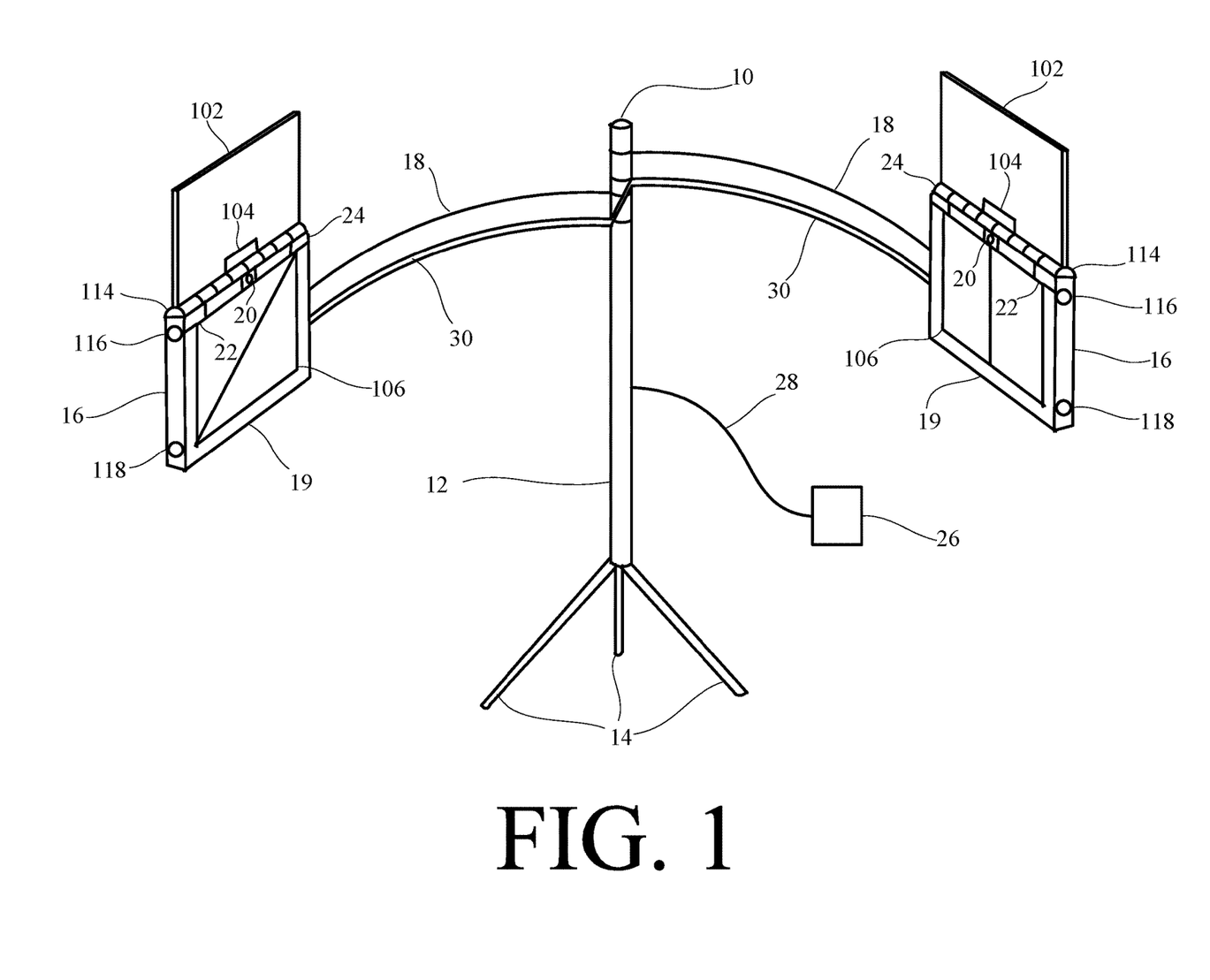
FIG. 1 is a front perspective view of the first preferred embodiment of the invention.

FIG. 1 is a front perspective view of a first preferred embodiment of the invention 10, comprising a support stand 12 with tripod legs 14, to which two display screens 16 are pivotally connected by arms 18. (The display screens are preferably flat screens similar to those used in television sets, computer monitors and cell phones.) As an alternative to the support stand, the apparatus may be hand held by a handle that can be folded for storage. Attached to the display screens (preferably in the bezel 19) are cameras 20, lights 22, and a push button 24 or other switch for turning the display screen on and off. (The camera may be attached to the display screen as a separate device, or in the bezel surrounding the screen, as is typically done when cameras are embedded by manufacturers in a television set or computer monitor. A camera may even be embedded in the screen itself; but to give a good quality image, it will probably have to be large enough to be visible, and thus interfere with the image on the screen.) A remote control 26 is connected to the stand by a cord 28. (Alternatively, the remote control may be connected wirelessly.) Each display screen is connected to the camera on the other display screen, either by wired means such as by the cable 30, or by wireless means. The cable may be any suitable electrical, fiber optic or other cable. Optionally, the invention may include a video and/or audio recorder.

The image 106 on either or both display screens may be split, to show input from both cameras. An image display switch 118 controls whether the image of the screen is split.

Figure 4:
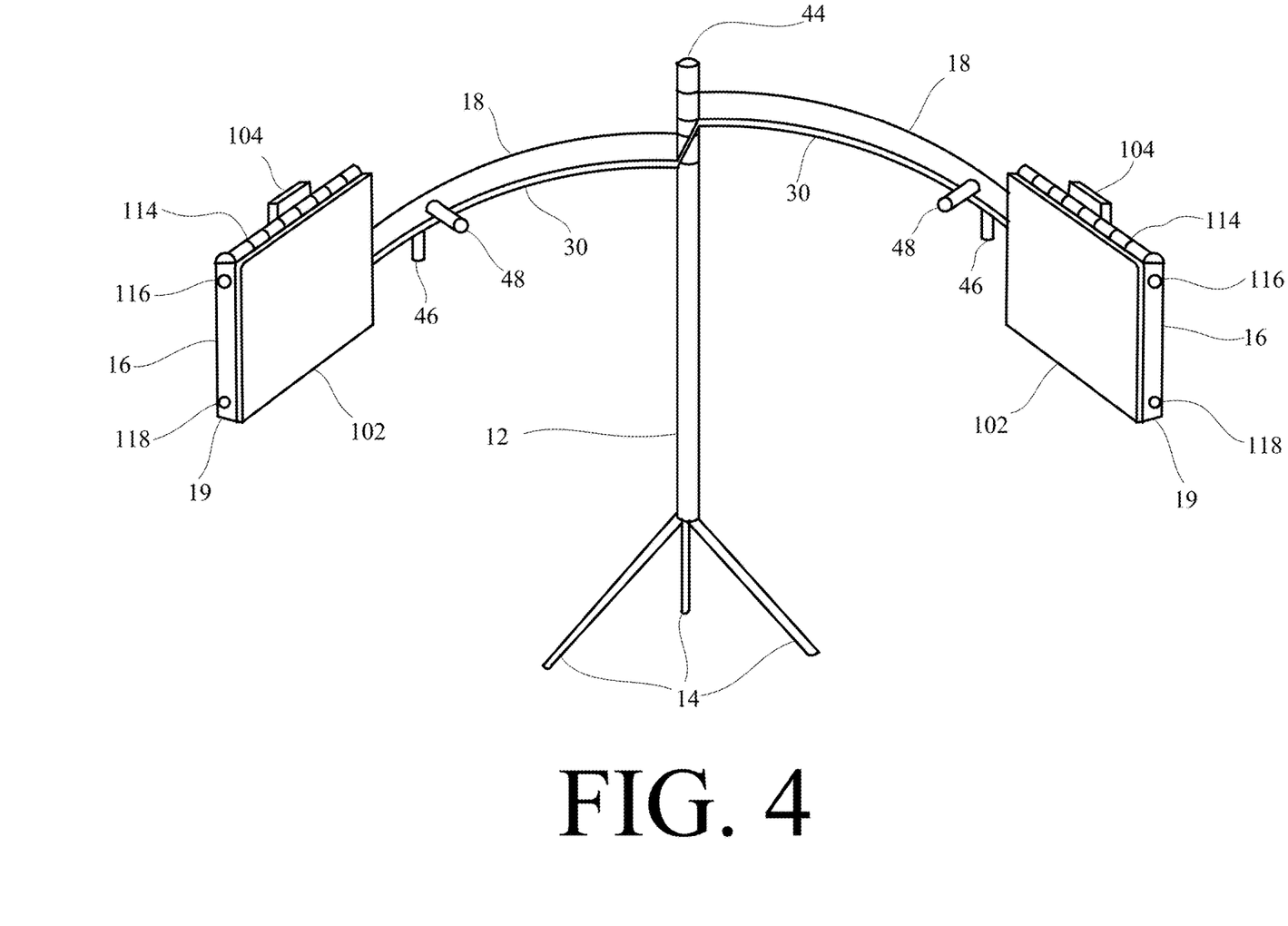
FIG. 4 is a front perspective view of the second preferred embodiment of the invention.

Double-sided flip-up mirrors 102 can cover the display screen. The mirrors are mounted on top of one or more display screens with hinges 114. Flip-control switches 116 can flip the mirrors up or down. One side of the flip-up mirrors acts as a mirror above the screen when they are up, and the other side acts as a mirror in front of the screen when they are down. The flip-control switches activate motors 104 that flip the mirrors up or down. The motors may push up buttons that push up the mirrors, or pull down the buttons to allow the mirrors to drop. The display screens may be automatically turned on when the mirrors flip upward, or automatically be turned off when the mirrors flip downward. In FIG. 1, the mirrors are shown in a flipped up position. In FIG. 4, the mirrors are shown in a flipped down position.

Figure 2:
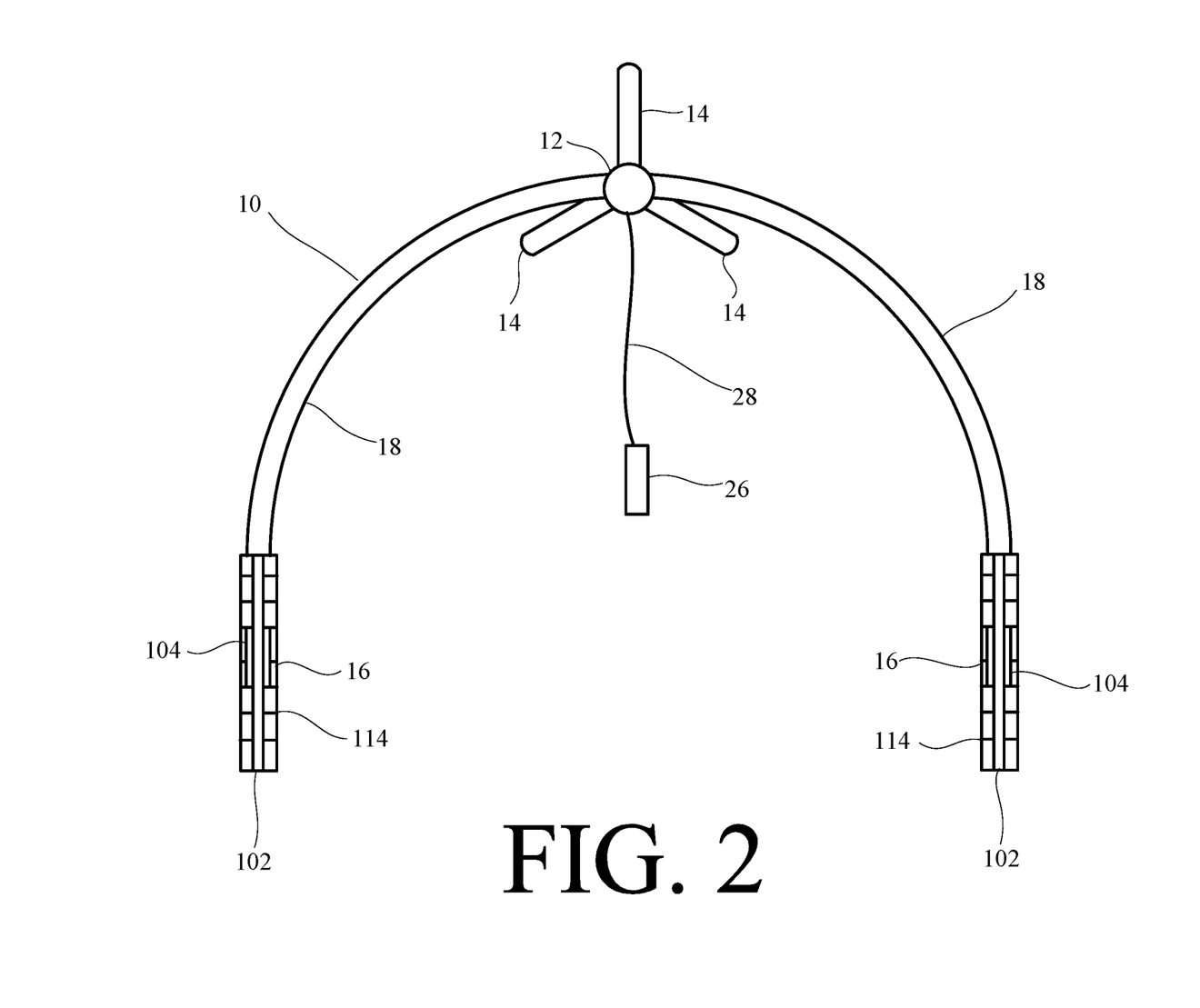
FIG. 2 is a top plan view of the first preferred embodiment of the invention.

FIG. 2 is a top plan view of the first preferred embodiment of the invention. Turning a screen on, turns on the camera attached to the other screen on; turning the screen off, turns off the camera attached to the other screen. Alternatively, both cameras may be on even if one screen is off, as when it is desired to display a split screen. The display screens may have reflective surfaces that act as mirrors when they are turned off. When the screens are on, the image seen by the camera on each screen is displayed on the other screen. For example, a user may see the front side of their head on one screen when it is turned off; then, when it (and the camera attached to the other screen) is turned on, see the back side of the user's head is visible on both screens/mirrors. Lights 22 may be used when there is not sufficient ambient lighting.

Figure 3:
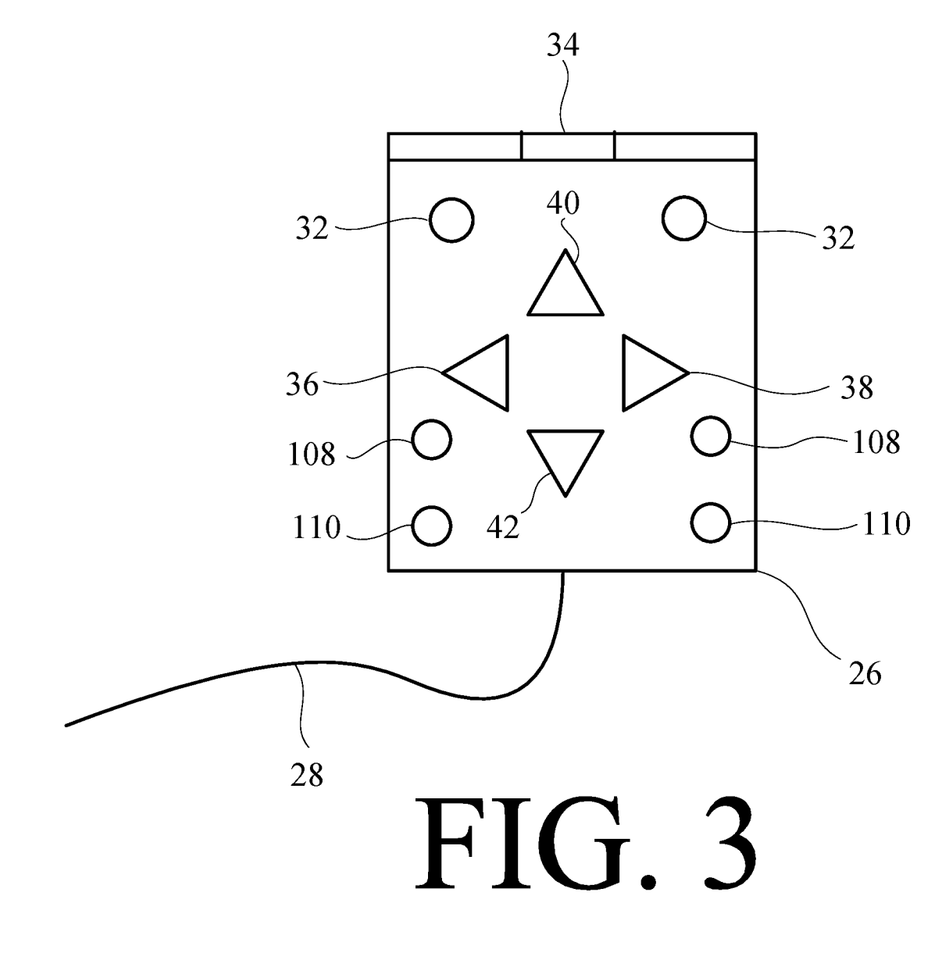
FIG. 3 is a detail view of the remote control of the first preferred embodiment of the invention.

FIG. 3 is a detail view of the remote control in the first preferred embodiment of the invention. On/off push button switches 32 each turn one of the display screens (and the camera on the other display screen) on and off. (It is not necessary to have on/off switches on both the display screens and the remote control; this is an optional feature.) Sliding switch 34 is slid to the left 36 to control the screen on the left (or rear), and to the right to control the screen on the right (or front). After a screen is selected using the sliding switch, pushing left switch 36 causes the selected screen and its arm to move left (clockwise as seen from above) around the vertical axis of the stand. Pushing right switch 38 causes the selected screen and its arm to move right (counterclockwise as seen from above) around the vertical axis of the stand. Pushing the up switch 40 causes the screen and its arm to move up. Pushing the down switch 42 causes the screen and its arm to move down. The movements of the arms and screens are caused by servomotors inside the stand (not shown in the drawings) or by other suitable means. There are image display switches 108 for each display screen, that control whether or not the display screen images are split. Flip-control switches 108 cause the mirror on a display screen to flip up or down. (It is not necessary to have flip-control switches on both the display screens and the remote control; this is an optional feature.)

FIG. 4 is a front perspective view of a second preferred embodiment of the invention 44, which differs from the first preferred embodiment in that the movement of the arms and screens is controlled by manual handles. The first set of handle 46 is used to move the arms and screens around the vertical axis of the stand. The second set of handles 48 is used to move the arms and screens up and down. No servomotors are required in the second preferred embodiment, as the user's muscles power the movement.

Figure 5:
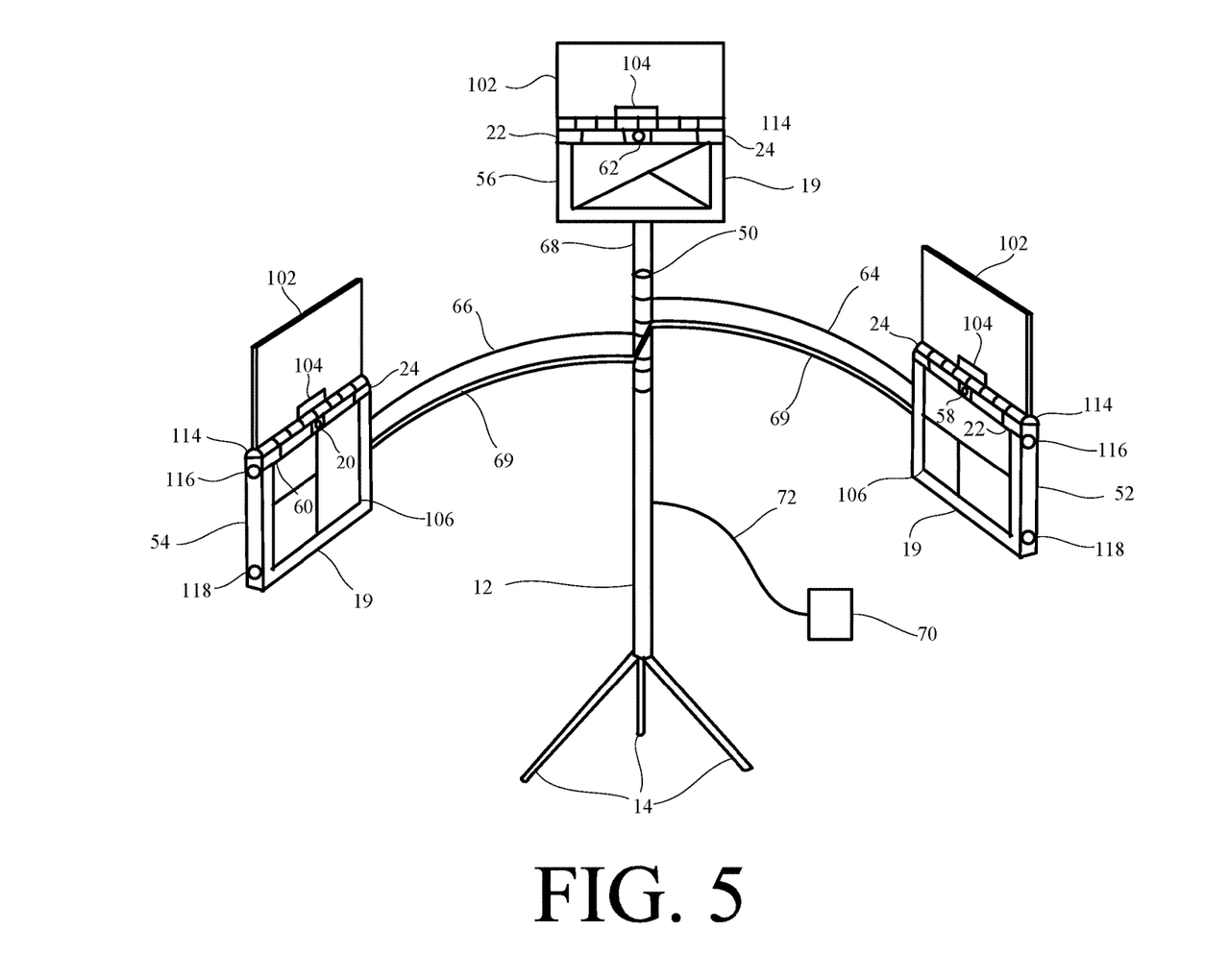
FIG. 5 is a front perspective view of the third preferred embodiment of the invention.
Figure 6:
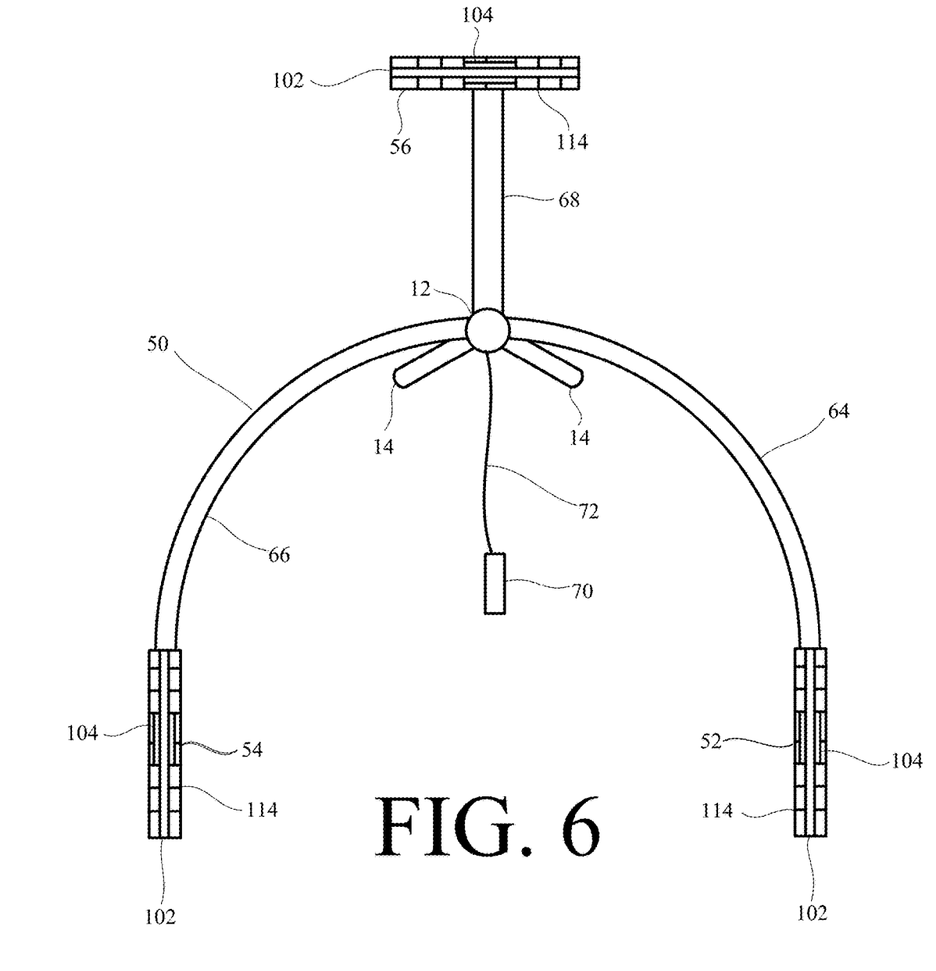
FIG. 6 is a top plan view of the third preferred embodiment of the invention.

FIG. 5 is a front perspective view, and FIG. 6 is a top plan view, of the third preferred embodiment of the invention 50, in which there are three or more display screens 52, 54 and 56 with attached cameras 58, 60 and 62, extending from arms 64, 66, 68. Cables 69 connect each camera to each of the display screens to which it is not attached. Movement of the arms, screens and cameras is controlled by remote control 70 attached to the stand by cord 72 (or connected wirelessly). Alternatively, manual handles may control movement of the arms, screens and cameras, as in the second preferred embodiment.

Figure 7:
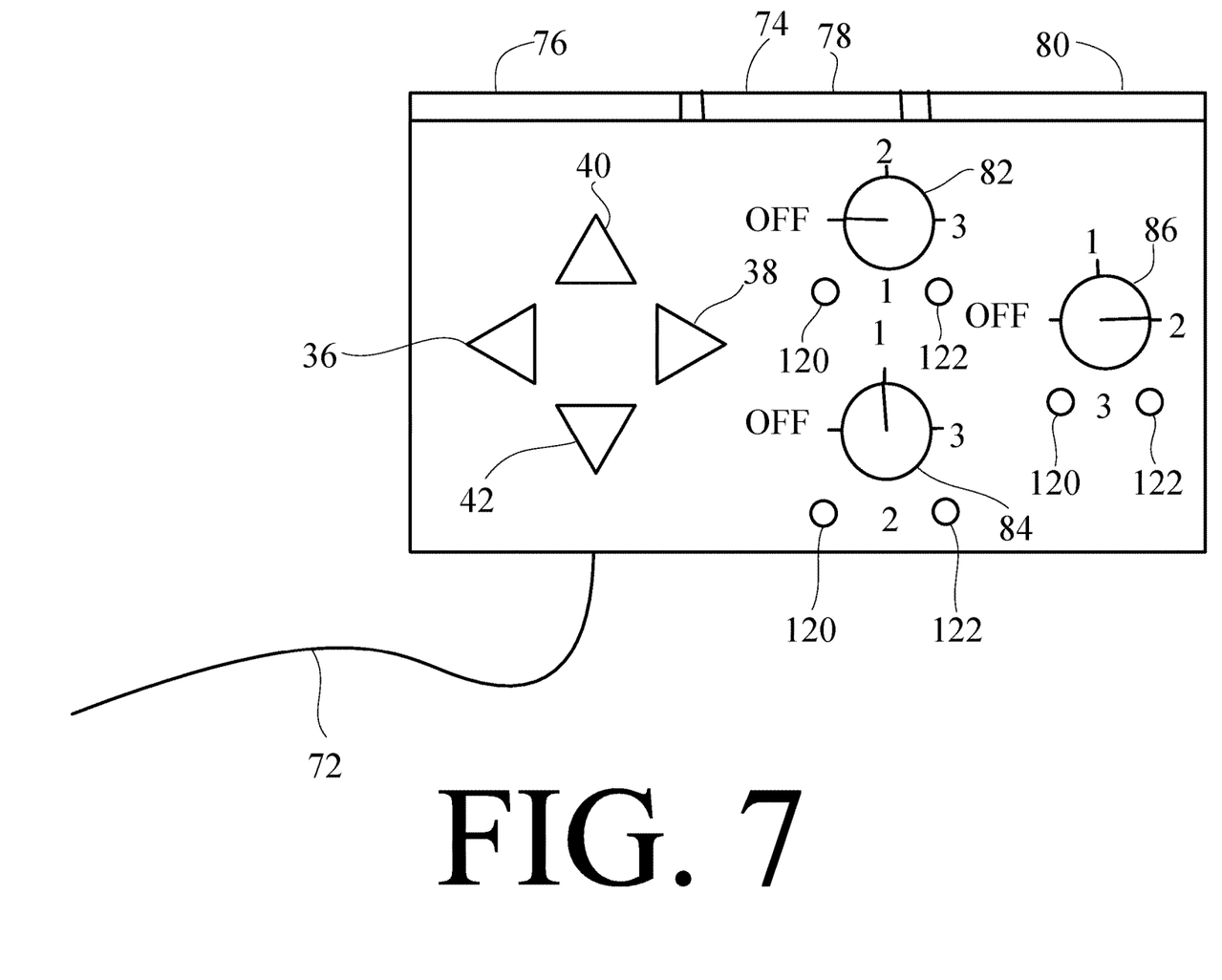
FIG. 7 is a detail view of the remote control of the third preferred embodiment of the invention.

FIG. 7 is a detail view of the remote control of the third preferred embodiment. The sliding switch 74 is slid to the left 76 to control the movement of the first arm 64 (and the attached screen and camera). When the sliding switch is in the middle position 78, the movement of the second arm 66 is controlled; in the right position 80, the movement of the third arm 68 is controlled. Once an arm is selected, the operation of the left switch 36, right switch 38, up switch 40 and down switch 42 is the same as in the first preferred embodiment. Rotary switch 1 (82) enables the user to select the camera whose input is viewed on the first screen 52. In the OFF position, the first screen is turned off. In the 2 position, input from the second camera 58 is viewed on the first screen. In the 3 position, input from the third camera 62 is viewed on the first screen. Rotary switch 2 (84) enables the user to select the camera whose input is viewed on the second screen 54. In the OFF position, the second screen is turned off. In the 1 position, input from the first camera 58 is viewed on the second screen. In the 3 position, input from the third camera 62 is viewed on the second screen. Rotary switch 3 (86) enables the user to select the camera whose input is viewed on the third screen 56. In the OFF position, the third screen is turned off. In the 1 position, input from the first camera 58 is viewed on the third screen. In the 2 position, input from the second camera 60 is viewed on the second screen. Image-display switches 120 for each display screen control whether or not the display screen images are split for each particular display screen. Flip-control switches 122 control whether mirrors are up or down for each particular display screen.

Figure 8:
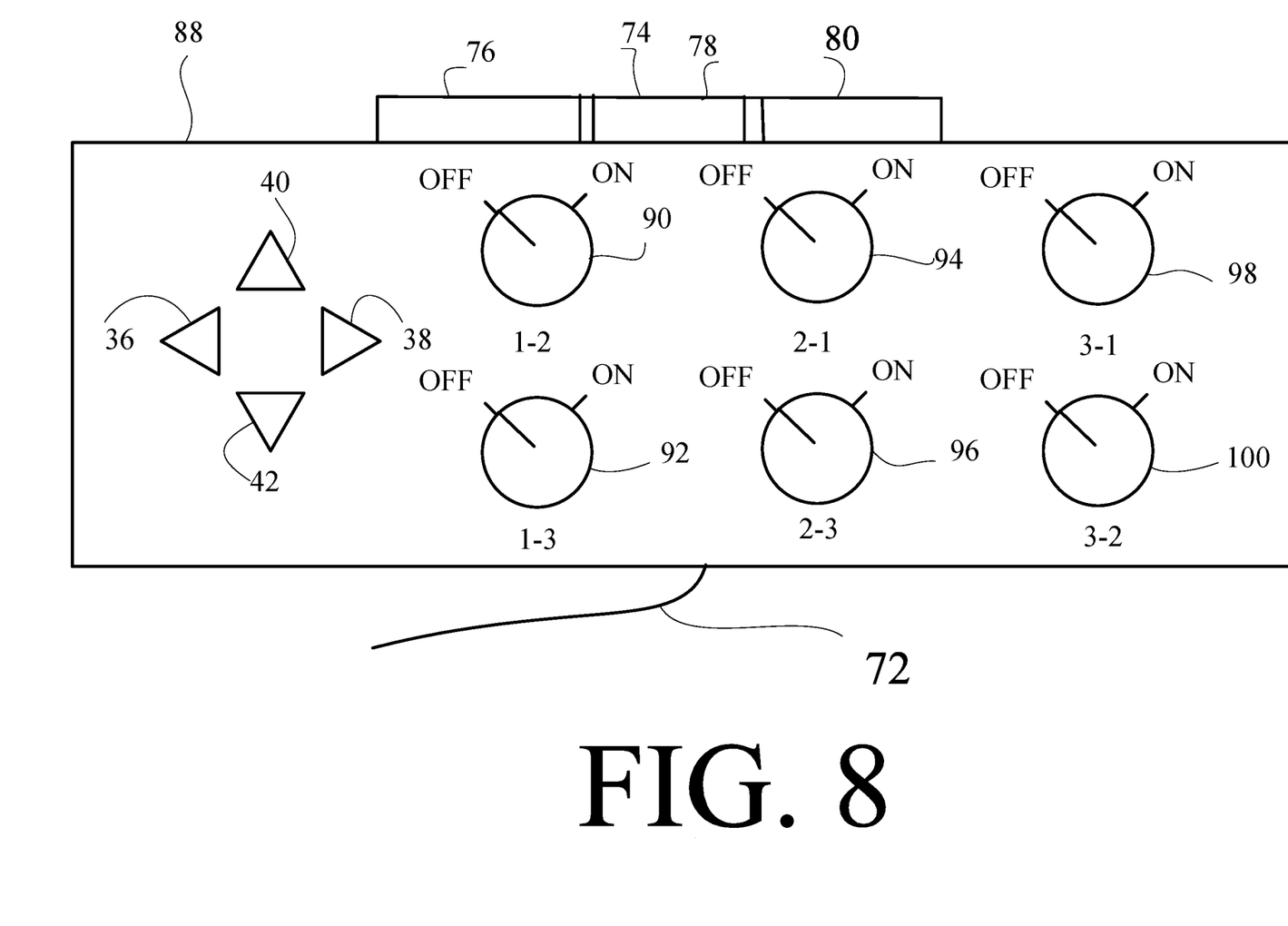
FIG. 8 is a detail view of the remote control of the fourth preferred embodiment of the invention.

FIG. 8 is a detail view of the remote control 88 of the fourth preferred embodiment of the invention, which differs from the third preferred embodiment in the way the connections between cameras and screens are controlled. The sliding switch 74 and left, right, up and down switches operate the same way as in the third preferred embodiment. Rotary switch 1-2 (90) enables the user to turn on or off the connection between the first camera 58 and the second screen 54. Rotary switch 1-3 (92) enables the user to turn on or off the connection between the first camera 58 and the third screen 56. Rotary switch 2-1 (94) enables the user to turn on or off the connection between the second camera 60 and the first screen 52. Rotary switch 2-3 (96) enables the user to turn on or off the connection between the second camera 60 and the third screen 56. Rotary switch 3-1 (98) enables the user to turn on or off the connection between the third camera 62 and the first screen 52. Rotary switch 3-2 (100) enables the user to turn on or off the connection between the third camera 62 and the second screen 54.

The third and fourth preferred embodiments may be adapted for any number of display screens with attached cameras, which may be in different configurations from those shown and described.

It is to be understood that the present invention is not limited to the embodiments described above, which are merely exemplary, but encompasses any and all embodiments within the scope of the following claims.

I claim:
1. A system, comprising:
two display screens, each having a reflective surface that can act as a mirror when the display screen is turned off;
a camera attached to each display screen;
connections selected from the group comprising wired connections and wireless connections, between each camera and the display screen to which it is not attached;
an on-off switch for each display screen, that can turn the display screen on or off, wherein an image on one or more of the display screens may be split between input from each camera;
image-display switches for each display screen, that control whether or not the display screen images are split;
double-sided flip-up mirrors that can cover the display screens, said mirrors being mounted on top of one or more of the display screens with hinges; and
flip-control switches that can flip up the mirrors;

wherein the flip-control switches are selected from the group comprising remote switches and switches attached to the display screens; and wherein the display screens are automatically turned on when the mirrors flip upward.

2. A system, comprising:

two display screens, with a camera attached to each display screen;

connections selected from the group comprising wired connections and wireless connections, between each camera and the display screen to which it is not attached; and an on-off switch for each display screen, that can turn the display screen on or off;

double-sided flip-up mirrors that can cover the display screens, said mirrors being mounted on top of one or more of the monitors with hinges; and flip-control switches that can flip up the mirrors;

wherein the flip-control switches are selected from the group comprising remote switches and attached to the display screens;

wherein the flip-control switches activate a motor that flips up the mirrors; and wherein the display screens are automatically turned on when the mirrors flip upward.

3. A system, comprising:

three or more display screens;

a camera attached to each display screen;

connections selected from the group comprising wired connections and wireless connections, between each camera and each of the display screens to which it is not attached;

a switch for each display screen, that can turn the display screen on or off, and if on, select which camera's input will be displayed on the display screen, wherein an image on one or more display screen may be split between input from one or more of the cameras;

image-display switches for each display screen, that control whether or not the display screen images are split;

wherein each display screen has a reflective surface that can act as a mirror when the display screen is turned off;

double-sided flip-up mirrors that can cover the display screens, said mirrors being mounted on top of one or more of the display screens with hinges; and flip-control switches that can flip up the mirrors;

wherein the flip-control switches are selected from the group comprising remote switches and attached to the display screens;

wherein the display screens are automatically turned on when the mirrors flip upward; and wherein the flip-control switches activate a motor that flips up the mirrors.

* * * * *